United States Patent [19]
Farr et al.

[11] 3,789,692
[45] Feb. 5, 1974

[54] SPOILER CONTROLLING MIXER

[75] Inventors: Alton E. Farr, Rolling Hills Estates; Lorin A. Wood, Lakewood, both of Calif.

[73] Assignee: McDonnell Douglas Corporation, Santa Monica, Calif.

[22] Filed: May 4, 1972

[21] Appl. No.: 250,116

[52] U.S. Cl. ............................ 74/480 R, 244/83 R
[51] Int. Cl. ............................................ G05g 11/00
[58] Field of Search ..... 74/480, 479, 469; 244/83 R

[56] References Cited
UNITED STATES PATENTS
3,709,056   1/1973   Stauber et al. ..................... 74/479

Primary Examiner—Allan D. Herrmann
Attorney, Agent, or Firm—George W. Finch; Walter J. Jason; Donald L. Royer

[57] ABSTRACT

A mechanical mixer for producing a spoiler controlling output by predeterminately combining lateral, speed brake, ground spoiler and direct lift control inputs. The mixer accomplishes this through the use of cams, followers, summing linkage, and override devices.

10 Claims, 5 Drawing Figures

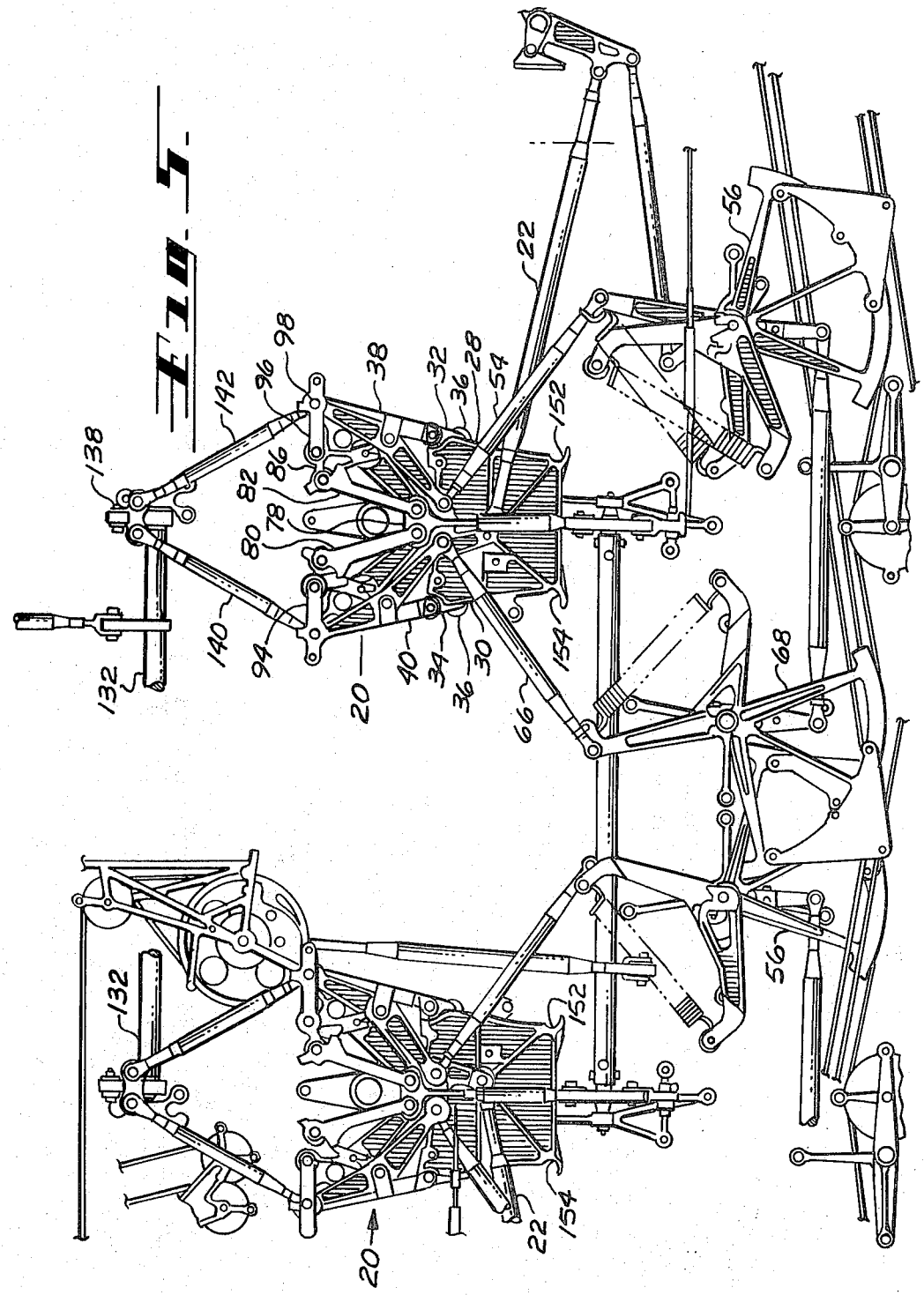

SPOILER CONTROLLING MIXER

BACKGROUND OF THE INVENTION

In large commercial aircraft it is highly desirable to incorporate spoilers into the primary flight control system of the aircraft and to use the spoilers concurrently for many different purposes. For example, in the DC-10 aircraft spoiler surfaces are used to augment the aileron control surfaces for high speed and low speed lateral control, as speed brakes while retaining a lateral control capability, as ground spoilers while retaining a lateral control capability and as optional means for producing direct lift control without inducing aircraft roll other than that commanded by the lateral control system of the aircraft.

Many devices have been available to mix lateral control signals with some other input, such as a speed brake input to produce a spoiler controlling output However, when it has been desired to combine lateral control signals with two or more other spoiler controlling inputs at the same time, the complexity of the mechanical problem has forced designers to look toward electrical or electro-hydraulic devices to sum the inputs even though mechanical mixers are preferred because of their inherent higher degree of reliability. Some electrical or electro-hydraulic summing devices seem to have advantages when it comes to accuracy, size and weight. However, when spoilers are employed as a portion of the primary flight control system for an aircraft, such summing means do not have sufficient reliability to allow their use in other than experimental aircraft where suitable means of escape are provided for the pilot and where a higher risk can be assumed. When such electrical or electro-hydraulic summing means are designed for use in a commercial passenger aircraft, they must be constructed in such a highly redundant configuration that their accuracy is seriously degraded and their size and weight becomes unacceptable.

SUMMARY OF THE INVENTION

The present invention is a mechanical mixer for receiving lateral control, speed brake, ground spoiler and optionally direct lift control inputs and for producing therefrom suitable spoiler actuating outputs which are corrected for the aerodynamic nonlinearity of the spoilers at a chosen flight condition. In brief, the mixer includes cam surfaces which are movable by inputs from the lateral control system, cam followers which ride on the cam surfaces, first summing links connected to the cam followers and to the direct lift control inputs, second summing links connected to the outputs of the first summing links and to combined speed brake and ground spoiler inputs and, override means connected to the outputs of the second summing links and to the lateral control inputs to predeterminently reduce speed brake and ground spoiler induced outputs so that lateral control can be maintained. The outputs of the override means are the spoiler controlling outputs. In addition, stationary cam surfaces and secondary followers connected to the first summing links are employed to restrict predetermined lateral control inputs so that the desired shape of programming the spoilers for direct lift control on the rising wing during a roll command is maintained It is therefore an object of the present invention to provide a completely mechanical, mixer device for combining lateral, speed brake, ground spoiler and direct lift control inputs into a programmed output for controlling spoilers on an aircraft.

Another object of the present invention is to increase the reliability and usefulness of aircraft spoilers.

Another object is to provide a mixer device which requires minimal maintenance.

Another object is to provide a mechanical mixer device which is adaptable to many different types and sizes of aircraft, the adaptation being mostly the modification of cam shaping.

Another object of the present invention is to eliminate unneeded electrical and electro-mechanical devices from the primary flight control system of an aircraft.

These and other objects and advantages of the present invention will become apparent after considering the following detailed specification which covers a particular embodiment of the present invention in conjunction with the accompanying drawings wherein;

BRIEF DESCRIPTION OF THE DRAWINGS

FIG. 5 is a plan view of the mixer assembly shown in FIG. 4.

DESCRIPTION OF THE PRESENT EMBODIMENT

Figure 1:
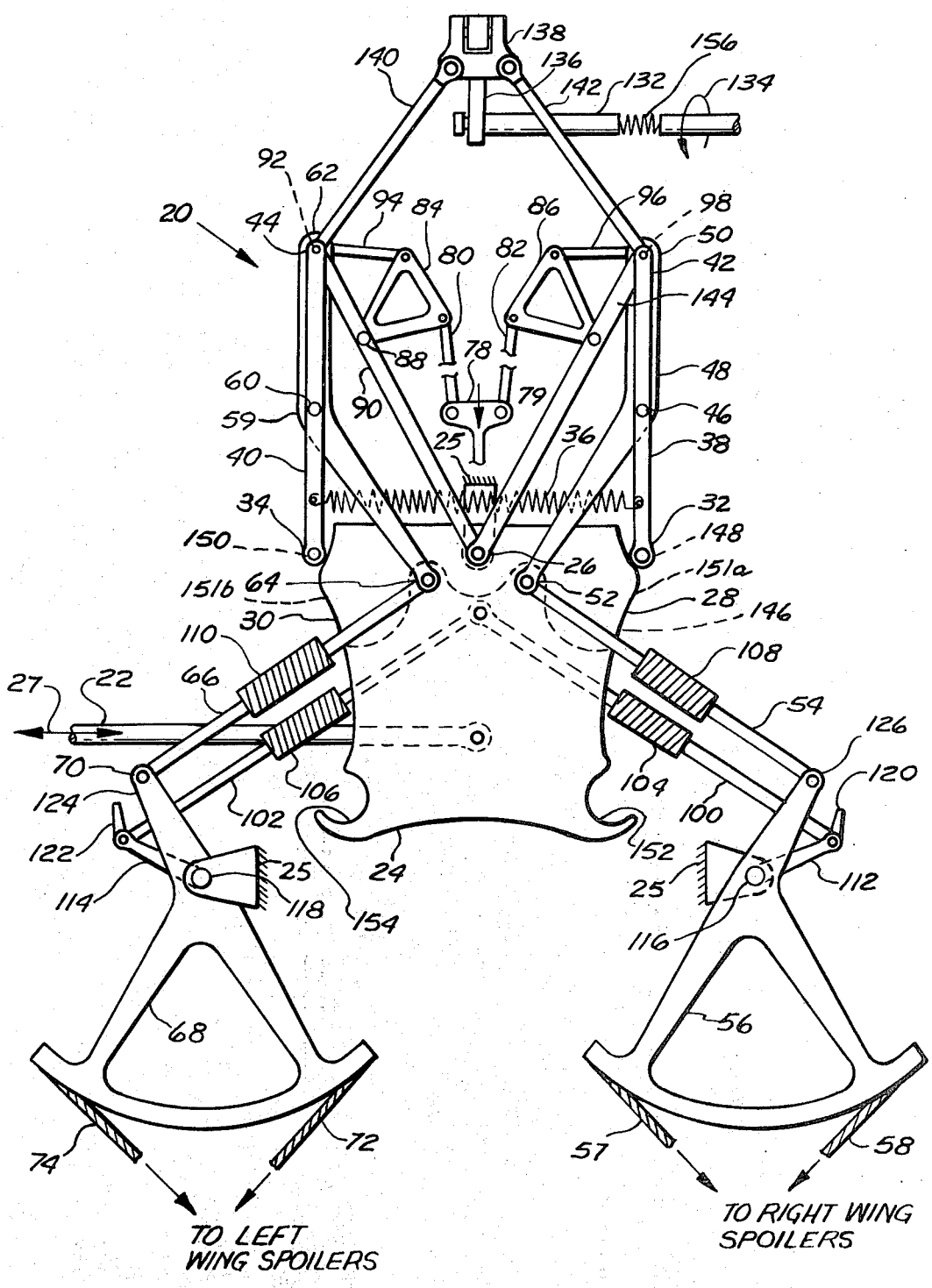
FIG. 1 is a simplified elevational view of a mixer device constructed according to the present invention.

Referring to the drawings more particularly by reference number, number 20 in FIG. 1 refers to a mixer device constructed according to the present invention. The mixer 20 is for combining lateral, speed brake, ground spoiler and direct lift control inputs into spoiler controlling outputs. The following description assumes an orientation of the mixer 20 as shown in FIG. 1 although the mixer 20 will operate properly in many different orientations.

The lateral control inputs are applied to the mixer 20 by means of a rod 22 which is attached to a cam 24 mounted for rotation with respect to base structure 25 by a pivot 26. Lateral control inputs in the form of motion of the rod 22 in the directions of arrow 27 cause the cam 25 to rotate about the pivot 26, connected to structure as shown. The cam 24 includes first and second cam surfaces 28 and 30 which are generally mirror images of each other. Cam followers 32 and 34 ride on the cam surfaces 28 and 30 respectively. The followers 32 and 34 are biased against the cam surfaces 28 and 30 by at least one spring 36 which extends from a first summing link 38 to which the follower 32 is attached to a similar summing link 40 to which the follower 34 is attached. The links 38 and 40 connect to pivots 42 and 44 at the opposite ends thereof respectively from the followers 32 and 34. When the pivots 42 and 44 are restrained, movement of the cam 24 in a counterclockwise direction causes the link 38 to swing about pivot 42 in the counterclockwise direction. This causes movement of a pivot 46 on the link 38 which pivot 46 interconnects link 38 to a second summing link 48. As long as the upper end 50 of the summing link 48 is restrained from movement, movement of the pivot 46 also causes the summing link 48 to rotate in a counterclockwise direction. The summing link 48 includes a pivot 52 at its end opposite from end 50 which connects the summing link 48 to a rod 54. The rod 54 is connected to a pivotally mounted sector 56 from which output cables 57 and 58 extend to feed spoiler controlling commands to the spoiler assemblies of the aircraft. Therefore, a lateral command causing the cam 24 to move counterclockwise produces an extension movement of the rod 54 to rotate the sector 56 clockwise and generate right wing spoiler extending outputs on cables 57 and 58 in accordance with the shaping of the cam surface 28.

The cam surface 30 is so shaped that counterclockwise movement of the cam 24 will not produce any appreciable motion of the cam follower 34 and its connected summing link 40. However, if the cam 24 is rotated clockwise by a lateral control input from rod 22, the cam follower 34 will be forced away from the pivot 26 to impart a clockwise motion to the summing link 40 as long as the link 40 is restrained from any movement but rotation by pivot 44. The summing link 40 is connected to another second summing link 59 by pivot 60. If the upper end 62 of the summing link 59 is restrained, clockwise movement of summing link 40 is transferred by the pivot 60 to the summing link 59 to cause it to rotate clockwise. A pivot 64 on the opposite end of the summing link 59 from the end 62 connects the link 59 to one end of a rod 66 whose opposite end is connected to a second sector 68 by pivot 70. As can be seen, clockwise motion of the cam 24 causes extension movement of the rod 66 to produce counterclockwise movement of the sector 68 which generates left wing spoiler extending outputs on output cables 72 and 74 connected thereto. The shaping of the cam surface 28 is such that the follower 32 and its connected summing link 38 does not move appreciably when the cam 24 is rotated in the clockwise direction.

Figure 2:
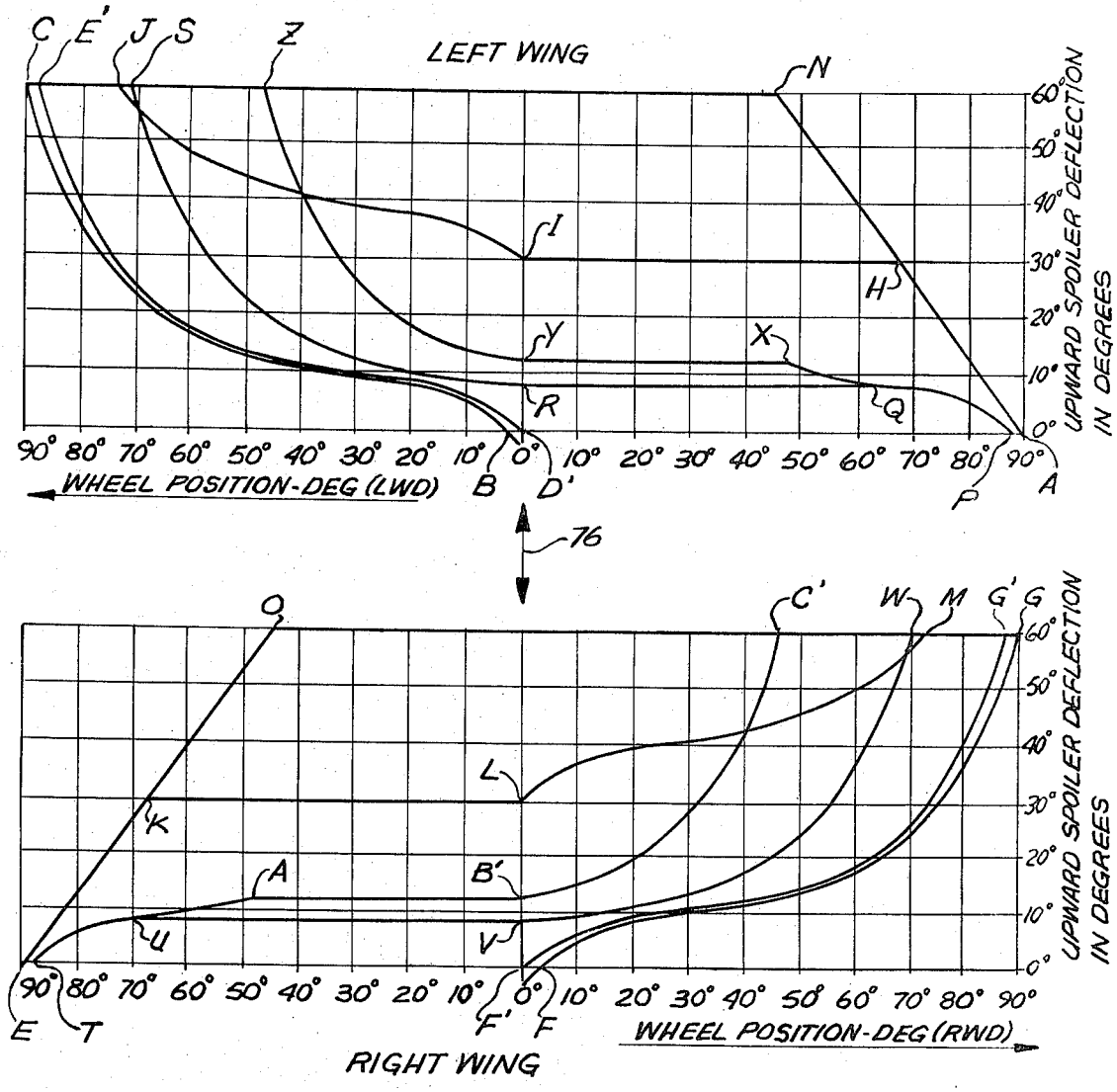
FIG. 2 is a graphical representation of the output of the present invention with respect to all lateral control inputs and selected values of direct lift control, speed brake, and ground spoiler inputs fed thereto.

FIG. 2 is a graphical representation of the outputs of the mixer 20 with respect to lateral control inputs and selected values of direct lift control (second input), speed brake, and ground spoiler inputs. The output of the mixer 20 for any lateral control can be found by mentally moving the double headed arrow 76 in accordance with the lateral control input or as labeled, wheel position. By then choosing the correct line or by interpolating between the lines, FIG. 2 can then be used to find the amount of spoiler extension on both the left and the right wing under various circumstances. For example, under the conditions discussed above where only lateral control inputs are being fed to the mixer 20, the spoiler deflection for the left wing with respect to wheel position is indicated by curve ABC, whereas the similar spoiler deflection for the right wing is indicated by curve EFG. It should be noted that the positions of points B and F are slightly off from the 0° wheel position. This results from the fact that all spoiler values are biased in the spoiler down direction when the spoiler surfaces are at 0° and the wheel is not deflected. Therefore, no spoiler extension output will be produced until approximately 2° of lateral control input is applied. The curves BC and FG are produced by the shaping of the cam surfaces 28 and 30 so that under a predetermined condition, usually with the aircraft in a landing configuration, the roll rate of the aircraft is approximately linear with the control wheel position. This is required since the aerodynamic effect of a spoiler is nonlinear with its extension and airspeed.

The speed brake and ground spoiler control inputs (third input) are applied by motion of a yoke 78 in the direction of arrow 79. The yoke 78 is shown above its actual position for clarity. The input motion of yoke 78 is transferred to rods 80 and 82 which are pivotally connected to the yoke 78 at their lower ends and to motion transferring members 84 and 86 respectively at their upper ends. The members 84 and 86 and the rods 80 and 82 are shown in zero input positions. The rods 80 and 82 are oriented in the mixer 20 to remain in substantial intersecting alignment with the axis of the pivot 26 so unwanted inputs are not generated thereby when other inputs are fed to the mixer 20.

The member 84 is connected for rotation by pivot 88 to link 90 which is pivotally connected to structure by pivot 26 and to the summing link 40 by means of pivot 44. The link 90 restrains the end of the summing link 40 adjacent the pivot 44 to a circular movement whose radius is the distance between the pivots 26 and 44. The member 84 transmits the motion of the yoke 78 to a pivot 92 by means of a rod 94 connected therebetween. With the orientation of the mixer 20 as shown, the pivot 92 is directly behind the pivot 44. The pivot 92 feeds speed brake or ground spoiler inputs to the upper end 62 of the summing link 59 which cause it to move outwardly. If the pivot 60 between the summing links 40 and 59 is restrained, a ground spoiler or speed brake input causes the summing link 59 to rotate clockwise which causes the rod 66 to extend, rotating the sector 68 in a counterclockwise direction and causing a left wing spoiler extending output command through the cables 72 and 74.

Assuming no other input commands to the mixer 20, a similar output command is also transmitted through cables 57 and 58 to the right wing spoilers. This is because the downward motion of the yoke 78 is also transferred through rod 82, member 86 and a rod 96 which is similar to rod 94 to the summing link 48 at pivot 98 which, with the orientation of the device 20 as shown, is directly behind pivot 42. With no other inputs, the pivot 46 between the summing links 38 and 48 is essentially fixed and the summing link 48 rotates counterclockwise causing an extension of rod 54 and the clockwise rotation of sector 56 producing the aforesaid right wing spoiler extension output command on cables 57 and 58.

The effect of speed brake or ground spoiler inputs can be seen in FIG. 2. Curve AHIJ shows the maximum extension of the left wing spoilers when a maximum speed brake input is being applied while curve EKLM shows the extension of the right wing spoilers under the same conditions. Of course the curves ABC and EFG show the zero speed brake condition. Partial speed brake inputs can be found by interpolating between curves ABC and AHIJ for the left spoilers and between curves EFG and EKLM for the right spoilers. The effect of a ground spoiler input which is a fully on input is shown by curve AHNC for the left spoiler and by curve EKOG for the right spoilers. Curves AHN and EKO are caused by override means designed into the mixer 20 so that under speed brake and ground spoiler conditions, lateral control can be maintained at large angles of wheel deflection by driving the spoilers of the appropriate wing down so that it will rise.

The override means are incorporated into the sectors 56 and 68. Rods 100 and 102 are connected to the lateral control input directly or indirectly as is the case in FIG. 1 where the rods 100 and 102 are connected to the movable cam 24. The rods 100 and 102 include override devices 104 and 106 respectively, while rods 54 and 66 also include override devices 108 and 110. Although the override devices are shown as being the caged spring type, many suitable override devices are available. The override devices 108 and 110 are weaker than the override devices 104 and 106 and are connected to abutment members 112 and 114. The abutment members 112 and 114 are mounted for rotation to base structure 25 by pivots 116 and 118 which can be the same pivots about which the sectors 56 and 68 rotate. The abutment members 112 and 114 include abutment surfaces 120 and 122 which are normally spaced from the respective sectors 56 and 68 so that they do not interfere with the operation thereof. However, when the condition of curve AHN occurs, the movement of the sector 68 with respect to the lateral control input is such that the abutment surface 122 contacts the sector 68 and abutment surface 124 thereon to drive it clockwise thus causing retraction of the left wing spoilers in accordance with curve AHN. If the large lateral control input is in the other direction, the abutment surface 120 contacts an abutment surface 126 on the sector 56 to drive the right wing spoilers down in accordance with curve EKO. Or course to drive the sector 56 and 68 to a position other than the normally commanded position requires that the override device 108 or 110 be compressed to allow a shortening of the rods 54 or 66. The overrides 104 and 106, on the other hand, prevent the lockup of the lateral control input due to the remote chance that a down driving cable 58 or 74 is jammed and down spoilers are commanded by the pilot.

Direct lift control inputs are induced into the mixer assembly 20 by rotation of rod 132 in the direction indicated by the arrow 134. The purpose of a direct lift control system such as shown in U.S. Pat. application Ser. No. 171,989, now U.S. Pat. No. 3,739,594, filed Aug. 16, 1972, entitled "Lift Control Mechanism" by B. P. Donovan et al., assigned to Applicants' assignee is to augment the response of the airplane to pitch commands at landing approach speeds by modulating the wing spoilers in unison. At initiation of the landing phase, usually as indicated by a predetermined lowering of the flaps, the direct lift control input moves to a preset bias condition which moves the spoilers to a preset raised position. An up elevator command thereafter usually results in a reduced direct lift control input which causes spoiler retraction to increase the wing lift while a down elevator command causes spoiler extension to decrease wing lift. This can be seen in FIG. 2 where curve APQRSC represents the direct lift control bias position for the left wing while curve ETUVWG represents the direct lift control bias position for the right wing. Taking the left wing, for example, it should be noted that the mixer 20 causes a retraction of spoiler input for lateral control angles over 70° as shown by curve PQ. This is necessary since the right wing spoilers have extended their maximum amount at about 70° of right wing down wheel position as shown by point W. Therefore, if it were not for the PQ portion of the curve APQRSC, the engagement of direct lift control or the use thereof when large lateral control inputs are being fed to the mixer, would produce a reduced potential for lateral control.

The direct lift control inputs can cause the mixer 20 to modulate the spoilers from the bias position APQRSC and ETUVWG upward to the positions indicated by curves AQXYZC and EUA'B'C'G and downward to the positions indicated by curves AD'E' and EF'G'.

The aforementioned direct lift control outputs are formed in the mixer 20 by introducing the rotational input of rod 132 into the mixer assembly 20 by means of a lever 136, a yoke 138 and two similar rods 140 and 142 attached to the yoke 138. The yoke 138 is shown in the zero input position. The rods 140 and 142 connect the yoke 138 to the pivots 44 and 42 respectively and cause link 90 and its companion link 144 to rotate counterclockwise and clockwise respectively about pivot 26. As aforesaid, since the geometry of the yoke 78 and the rods 80 and 82, and the members 84 and 86 are specially chosen, there is very little movement of pivots 92 and 98 due to the direct lift control input. However, the rotation of the links 90 and 144 does produce substantial movement of the pivots 44 and 42 causing outward movement of the pivots 60 and 46. The outward movement of the pivots 60 and 46 cause the pivots 64 and 52 to move outwardly since the upper pivots 92 and 98 of the links 59 and 48 are essentially fixed thereby causing spoiler extension outputs by means of the rods 66 and 54 and the sectors 68 and 56. The shaping of the DLC output as represented by curves RS and VW in the bias condition is due to lateral control inputs since rotation of the cam 24 also can cause movement of the pivots 60 and 46. However, the flat portion of the direct lift control curves are created in the mixer 20 by a stationary cam 146 positioned behind cam 24 and shown in dotted outline. Extension followers 148 and 140 positioned in back of followers 32 and 34 come into contact with first and second cam surfaces 151a and 151b of the cam 146 any time the cam surfaces 28 and 30 and followers 32 and 34 do not hold them outward therefrom. Therefore, the cam 146 and followers 148 and 150 restrict the inward movement possible for the followers to cause the straight portions of the curves. The slightly shaped portions of the curves, for example, PQX and TUA', are caused by the followers 32 or 34 engaging hook portions 152 or 154 of the cam surfaces 28 or 30, respectively. The follower engages a hook portion when the full spoiler output on one side is being commanded and thereafter any additional lateral control input causes the mixer to back drive the direct lift control input to a lower value. The lowered direct lift control input to a lower value. The lowered direct lift control input of course, then causes a retraction of spoilers on the opposite side as shown by the curves PQX and TUA'. The back driving of the direct control input is possible due to a resilient connection of the direct lift control input as diagrammatically indicated by spring 156 in the direct lift control input rod 132.

Figure 3:
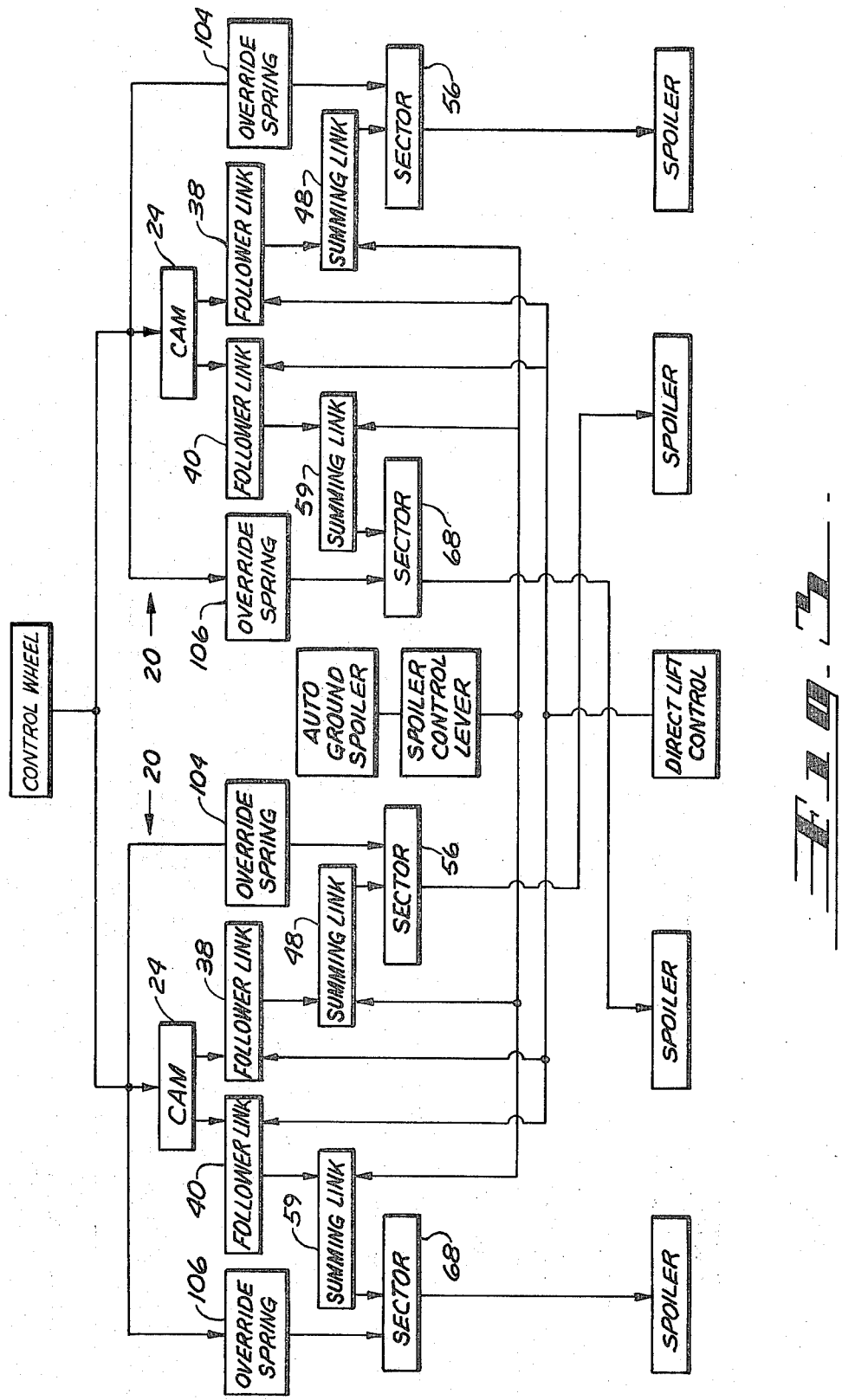
FIG. 3 is a block diagram showing a mixer assembly having two mixer devices constructed according to the present invention.

FIG. 3 is a block diagram of the complete spoiler controlling system including two mixers 20, the blocks previously described, being number the same. As can be seen, at least two devices 20 are usually employed and they are used to operate separate spoilers on both wings. This is to insure that even in the remote event that a mixer device 20 fails, spoiler control means will still be available.

Figure 4:
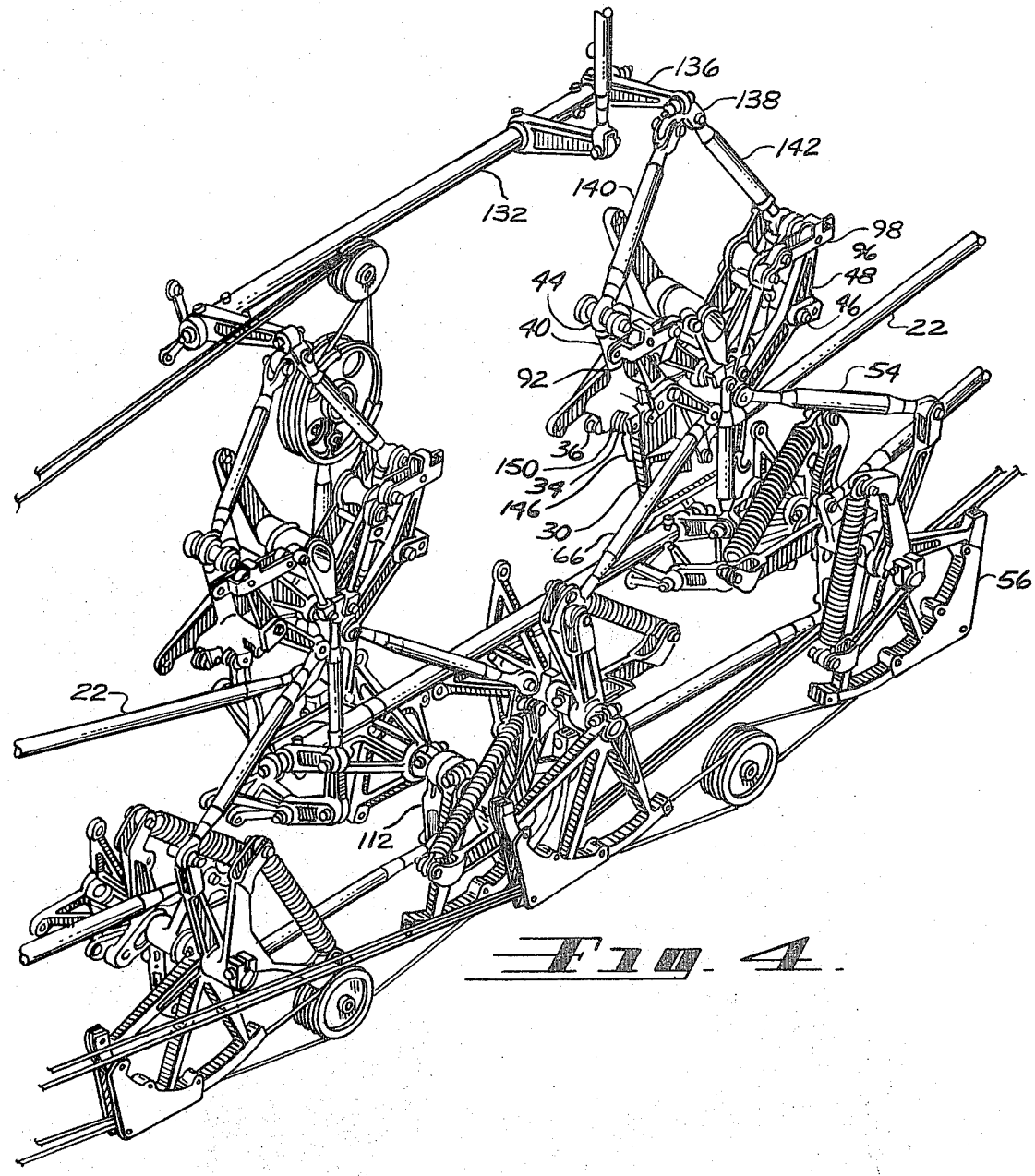
FIG. 4 is a detailed perspective view of the mixer assembly diagramed in FIG. 3.

FIGS. 4 and 5 disclose the actual mechanical embodiment of the present invention which forms part of the DC-10 aircraft. In FIG. 4 and 5 it is possible to see certain components of the mixer 20 which are hidden in FIG. 1. For example, it is possible to see the stationary cam 146, and the actual positioning of the rods 80 and 82 with their connecting yoke 78. Also it should be noted that the cam 24 and the abutment member 112 are shown independently driven from a lateral input member 160 and that the override devices 104, 106, 108 and 110 are incorporated into the sectors 56 and 68 rather than into the rods 54, 66, 100 and 102 and are sissor-type override devices 162, 164 and 166.

Thus there has been shown and described a novel spoiler controlling mixer which fulfills all of the objects and advantages sought therefor. Many changes, modifications, variations and other uses and applications of the subject mechanism will, however, become apparent to those skilled in the art after considering this specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. A mixer for producing outputs for controlling a spoiler on an aircraft from lateral control, second and third inputs where it is desired that spoilers on opposite wings of the aircraft normally move in the same direction in response to second or third inputs, the mixer including:

a base structure;

a cam having a first cam surface of predetermined shape thereon, said cam being pivotally mounted to said base structure wherein changes in said lateral input cause said cam to pivot to changed positions;

a first summing link, said first summing link including bias means to urge said first summing link in a predetermined direction, cam follower means, second input receiving means spaced from said cam follower means and a pivot connection spaced from said cam follower means and said second input receiving means, said cam follower means being urged by said bias means and positioned to predeterminately engage and follow said first cam surface; and a second summing link, said second summing link including a connection to said first summing link pivot connection, output means for producing spoiler controlling outputs for a first side of the aircraft spaced from said connection and third input receiving means spaced from said connection and said output means.

2. The mixer defined in claim 1 further including:
   a second cam fixed to said base structure, said second cam having a first stationary cam surface with a shape which is similar to the shape of a portion of said first cam surface of said pivotal cam wherein said cam follower means are positioned to engage and follow said first stationary cam surface at predetermined combinations of inputs, said engagement causing disengagement of said follower means from said first cam surface of said pivotal cam.

3. The mixer defined in claim 1 including:
   override means, said override means being connected to said output means of said second summing link and to a lateral control input, said override means causing reduced spoiler extension outputs in response to changes of lateral control inputs to increase aircraft roll rate during predetermined conditions of the third input.

4. The mixer defined in claim 1 wherein said first pivotal cam surface includes a hook portion for restricting said cam follower means from further travel along said first pivotal cam surface.

5. The mixer defined in claim 4 wherein said second input is resiliently connected to said mixer, said hook portion when restricting said cam follower means for further travel along said first pivotal cam surface, causes further roll rate increasing lateral control input to drive said second input to a lower spoiler extending level.

6. The mixer defined in claim 1 wherein said second input receiving means include a point on said first summing link and means for restraining said point to be movable only on an arc of predetermined radius from the point around which said pivotal cam can be pivoted.

7. The mixer defined in claim 1 wherein said pivotal cam includes a second cam surface opposite and mirror-imaged in shape to said first cam surface, said mixer including:

an additional first summing link, said additional first summing link inlcuding bias means to urge said additional first summing link in a predetermined direction, cam follower means, second input receiving means spaced from said cam follower means and a pivot connection spaced from said cam follower means and said second input receiving means, said cam follower means being urged by said bias means and positioned to predeterminately engage and follow said second pivotal cam surface; and an additional second summing link, said additional second summing link including a connection to said additional first summing link pivot connection, output means spaced from said connection, said additional second summing link output means producing spoiler controlling outputs for the side of the aircraft opposite from the first side, and third input receiving means spaced from said connection and said output means.

8. The mixer defined in claim 7 including third input transmitting means connected to pass a third input command to said third input receiving means of said second summing link and to said third input receiving means of said additional second summing link.

9. The mixer defined in claim 7 including second input transmitting means connected to pass equally a second input command to said second input receiving means of said first summing link and to said second input receiving means of said additional first summing link.

10. The mixer defined in claim 9 wherein said first and second pivotal cam surfaces each include a hook portion for restricting associated cam follower means from further travel along said pivotal cam surface, said second input transmitting means being resiliently connected to said two second input receiving means so that after one of said hook portions is restricting cam follower means, further roll rate increasing lateral control input drives said second input transmitting means to a lower spoiler extending level thereby lowering the spoiler extending output of the second summing link associated with the other hook.

* * * * *